United States Patent [19]

Kushi et al.

[11] Patent Number: 5,033,574
[45] Date of Patent: Jul. 23, 1991

[54] TRACTION CONTROL DEVICE FOR A VEHICLE

[75] Inventors: Naoto Kushi; Toshio Takaoka, both of Toyota, Japan

[73] Assignee: Toyota Jidosha Kabushiki Kaisha, Toyota, Japan

[21] Appl. No.: 506,923

[22] Filed: Apr. 9, 1990

[30] Foreign Application Priority Data

Apr. 12, 1989 [JP] Japan .................................. 1-92700

[51] Int. Cl.$^5$ ............................................. B60K 31/00
[52] U.S. Cl. .................................................. 180/197
[58] Field of Search ............... 180/197; 123/519, 520; 364/426.03

[56] References Cited

U.S. PATENT DOCUMENTS

| 4,432,430 | 2/1984 | Lind et al. | 180/197 |
| 4,736,728 | 4/1988 | Takahashi et al. | 180/197 |
| 4,811,808 | 3/1989 | Matsumoto et al. | 180/197 |
| 4,817,576 | 4/1989 | Abe et al. | 123/519 |
| 4,841,940 | 6/1989 | Uranishi et al. | 123/520 |

*Primary Examiner*—Charles A. Marmor
*Assistant Examiner*—Michael Shaughnessy

[57] ABSTRACT

A traction control device comprising a subthrottle valve arranged upstream of the main throttle valve. When the speed difference between the rotating speed of the free running wheel and the rotating speed of the driven wheel exceeds a predetermined value, the subthrottle valve is closed to reduce the output torque of the engine, and the supply of EGR gas into the intake passage and the supply of fuel vapor from the charcoal canister into the intake passage are stopped when the subthrottle valve is closed.

20 Claims, 12 Drawing Sheets

| Fig. 1 |
|---|
| Fig.1A |
| Fig.1B |

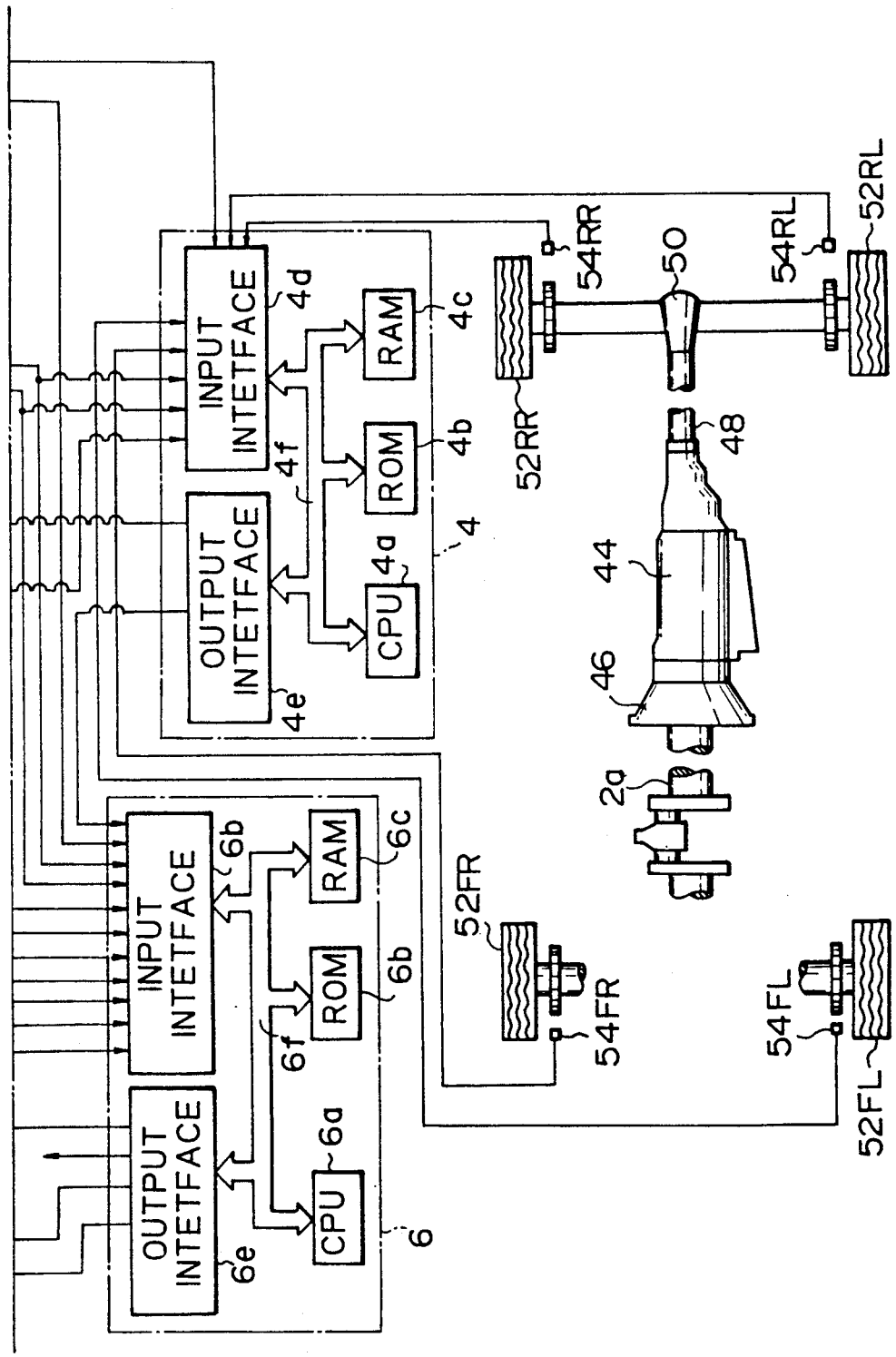

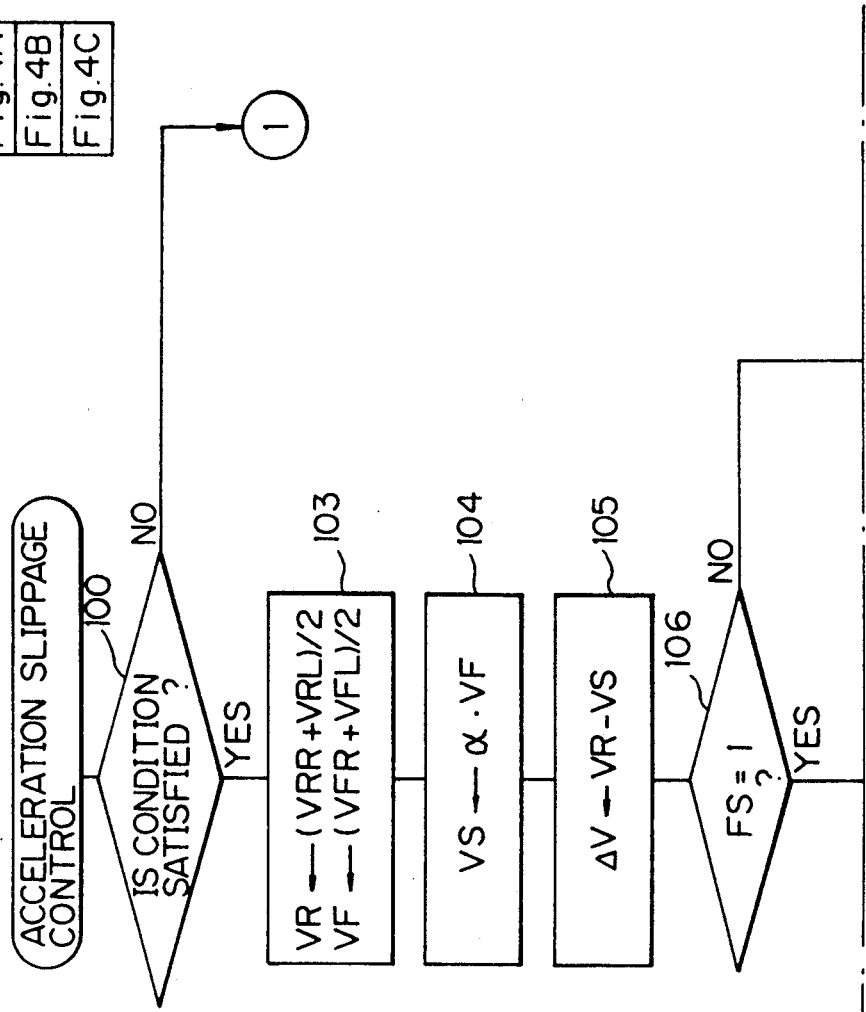

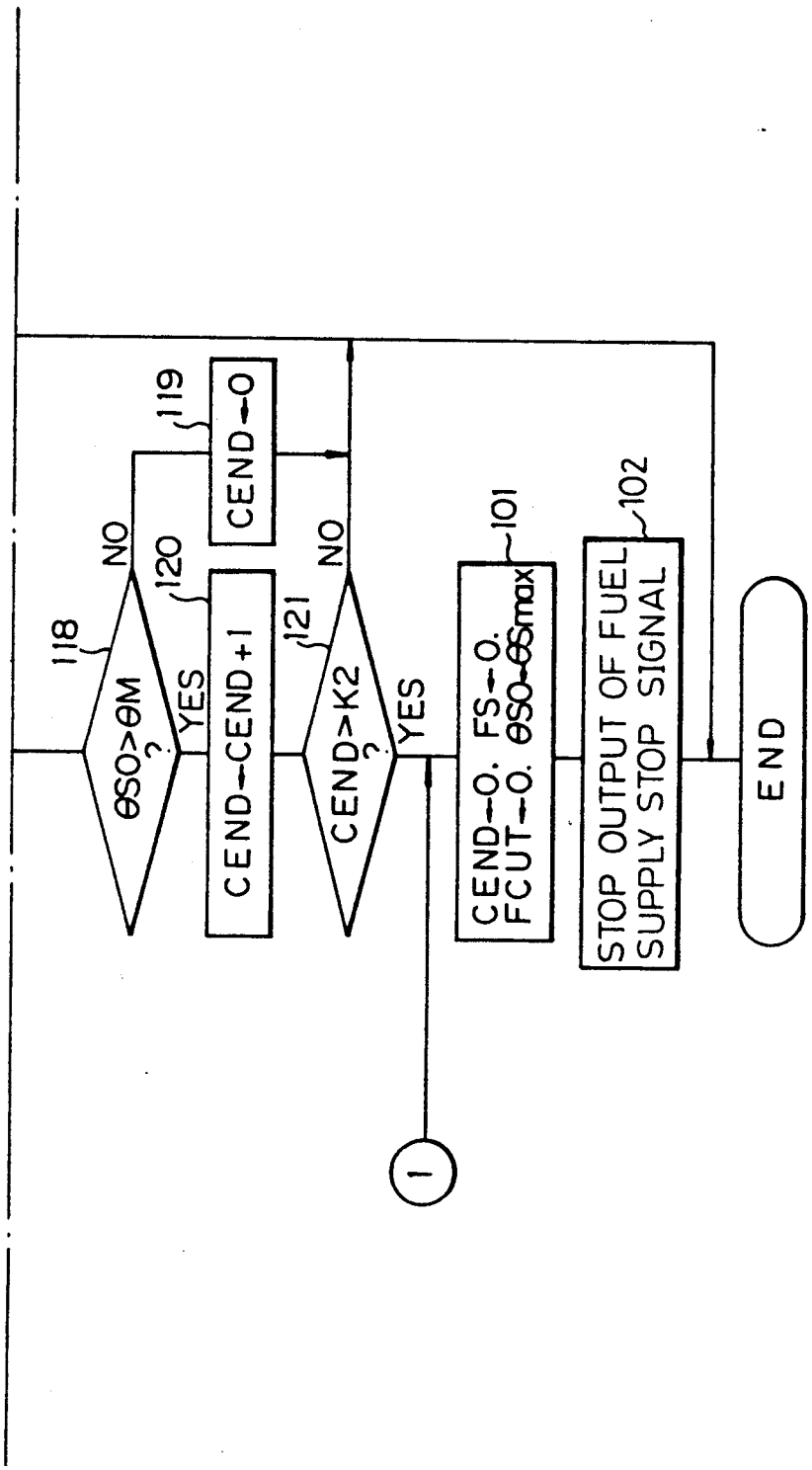

TRACTION CONTROL DEVICE FOR A VEHICLE

BACKGROUND OF THE INVENTION

1. Field of the Invention

The present invention relates to a traction control device for a vehicle.

2. Description of the Related Art

In a known traction control device, to suppress the occurrence of slippage of the driven wheel when the engine is accelerated, an additional subthrottle valve, which is not connected to the accelerator pedal, is arranged in the intake passage of the engine as a supplement to the main throttle valve connected to the accelerator pedal. The closing operation of the subthrottle valve is controlled in accordance with the amount of slippage, to reduce the output torque of the engine (see, for example, Japanese Unexamined Patent Publication No. 63-109247).

Further, an engine is normally equipped with an exhaust gas recirculation (hereinafter referred to as an EGR) device for recirculating the exhaust gas into the intake passage of the engine, to reduce the amount of $NO_x$ in the exhaust gas. This EGR device is controlled in response to the level of vacuum acting on the vacuum port formed in the inner wall of the intake passage. This vacuum port is normally positioned near the throttle valve, so that the vacuum port is open to the intake passage upstream of the throttle valve when the degree of opening of the throttle valve is smaller than a fixed degree, i.e., when the engine is operating under a light load, and that the vacuum port is open to the intake passage downstream of the throttle valve when the degree of the throttle valve exceeds the fixed degree. In this case, when the engine is operating under a light load, a vacuum does not substantially act on the vacuum port, and at this time, the recirculating operation of the EGR gas is stopped. When the engine is operating under a medium load, i.e., when the throttle valve is half open, since the vacuum port is opened to the intake passage downstream of the throttle valve, a large vacuum acts on the vacuum port, and at this time the EGR gas is recirculated. Conversely, when the engine is operating under a heavy load, i.e., when the throttle valve is fully open, although the vacuum port is open to the intake passage downstream of the throttle valve, a vacuum does not substantially act on the vacuum port, and accordingly, the recirculating operation of the EGR gas is also stopped at this time.

Furthermore, an engine is also normally equipped with a charcoal canister for temporarily adsorbing fuel vapor generated in the fuel tank, to prevent the fuel vapor from escaping to the outside air. This charcoal canister is normally connected to a purge port formed on the inner wall of the intake passage, and when a vacuum acts on the purge port, the fuel vapor adsorbed by the charcoal canister is purged into the intake passage from the purge port, and the thus-purged fuel vapor is burned in the engine cylinders. This purge port is normally arranged near the throttle valve so that the purge port is open to the intake passage upstream of the throttle valve when the degree of opening of the throttle valve is smaller than a fixed degree, i.e., when the engine is operating under a light load, and that the purge port is open to the intake passage downstream of the throttle valve when the degree of the throttle valve exceeds the fixed degree. In this case, when the engine is operating under a light load, a vacuum does not substantially act on the vacuum port, and at this time, the purging operation of the fuel vapor is stopped. When the engine is operating under a medium load, i.e., when the throttle valve is half open, since the purge port is opened to the intake passage downstream of the throttle valve, a large vacuum acts on the purge port, and at this time, the fuel vapor is purged. Conversely, when the engine is operating under a heavy load, i.e., when the throttle valve is fully open, although the purge port is open to the intake passage downstream of the throttle valve, a vacuum does not substantially act on the purge port, and accordingly, the purging operation of the fuel vapor is stopped at this time.

Where such an EGR device is incorporated into an engine equipped with such a traction control device, the vacuum port of the EGR device is arranged near the main throttle valve, so that the level of vacuum acting on the vacuum port can be controlled by the main throttle valve, and the EGR gas is fed into the intake passage downstream of the main throttle valve. In this case, since a part of the EGR gas reaches the main throttle valve, carbon, etc. contained in the EGR gas adheres to the main throttle shaft. Nevertheless, even if carbon, etc. is adhered to the main throttle shaft, since the main throttle valve is operated by the accelerator pedal under a strong power, there is no danger that the main throttle valve can not be controlled. Nevertheless, the subthrottle valve normally remains fully open, and the subthrottle valve is controlled by an electric motor under a weak power. Consequently, if carbon, etc. is adhered to the subthrottle valve shaft, there is a danger that the subthrottle valve will not be able to operate. Consequently, to prevent the EGR gas from reaching the subthrottle valve, the subthrottle valve is normally arranged upstream of the main throttle valve.

Nevertheless, if the vacuum port of the EGR device is arranged near the main throttle valve, and the subthrottle valve is arranged upstream of the main throttle valve, the following problem will arise. Namely, when the engine is operating under, for example, a heavy load, since a vacuum does not substantially act on the vacuum port of the EGR device as mentioned above, the recirculation of the EGR gas is stopped. At this time, however, if the slippage of the driven wheel occurs, since the subthrottle valve is closed, a large vacuum acts on the vacuum port of the EGR device, and thus the recirculation of the EGR gas is carried out. Accordingly, since the subthrottle valve is closed to a position in which a reduction in the output torque of the engine, which reduction suitably suppresses the slippage of the driven wheel, can be obtained while the recirculation of the EGR gas is not carried out, if the recirculation of the EGR gas is carried out at this time, as mentioned above, the output torque of the engine is considerably reduced. As a result, problems arise in that surging or misfiring of the engine will occur, and there is a danger of an engine stalling.

Further, where the purge port of the charcoal canister is arranged near the main throttle valve, and the subthrottle valve is arranged upstream of the main throttle valve, if the subthrottle valve is closed when the engine is operating under a heavy load, since a large vacuum acts on the purge port, fuel vapor is fed into the intake passage, and as a result, there is a danger that the air-fuel mixture will become excessively rich and thus engine stalling will occur.

In addition, in a majority of fuel injection type engines, the actual fuel injection time is calculated by multiplying a basis injection time by both the feedback correction coefficient and the learning coefficient. The feedback correction coefficient is controlled by the signal output from the oxygen concentration detector arranged in the exhaust passage of the engine, so that the air-fuel ratio of the air-fuel mixture becomes equal to, for example, the stoichiometric air-fuel ratio, and the learning coefficient is controlled so that the mean value of the feedback correction coefficient is maintained at about 1.0. This learning coefficient is provided for equalizing the air-fuel ratio with the stoichiometric air-fuel ratio when both the recirculation of the EGR gas and the purging operation of the fuel vapor are not carried out, and thus the learning coefficient is renewed in an engine operating state in which both the recirculating operation of the EGR gas and the purging operation of the fuel vapor are to be stopped. Nevertheless, even if the engine is operating in a state in which both the recirculation of the EGR gas and the purging operation of the fuel vapor is to be stopped, when the subthrottle valve is closed, the EGR gas and the fuel vapor are fed into the intake passage, and the air-fuel mixture becomes lean or rich. At this time, since the learning coefficient is renewed, the learning coefficient deviates from a correct value, and thus a problem arises in that the air-fuel ratio will deviate from the stoichiometric air-fuel ratio after the traction control is completed.

SUMMARY OF THE INVENTION

An object of the present invention is to provide a traction control device capable of obtaining a desired good traction control.

According to the present invention, there is provided a traction control device of a vehicle having a free running wheel and a driven wheel driven by an engine having a main throttle valve arranged in an intake passage and controlled by an accelerator pedal; the traction control device comprising: a normally opened subthrottle valve arranged in the intake passage upstream of the main throttle valve; means for detecting the rotating speed of the free running wheel; means for detecting the rotating speed of the driven wheel; speed difference calculating means for calculating a speed difference between the rotating speed of the free running wheel and the rotating speed of the driven wheel; valve control means for controlling the subthrottle valve in response to the speed difference to close the subthrottle valve when the speed difference exceeds a predetermined value; additional gas supply means for feeding an additional gas into the intake passage, the amount of the additional gas being changed in accordance with the level of vacuum in the intake passage downstream of the subthrottle valve; supply control means for controlling the additional gas supply means to stop the supply of the additional gas when the subthrottle valve is closed, the supply control means stopping the supply of the additional gas when the absolute pressure detected by the pressure sensor is lower than the absolute pressure stored in the memory; a main throttle sensor for detecting the degree of opening of the main throttle valve; a pressure sensor for detecting an absolute pressure in the intake passage downstream of the main throttle valve; and a memory storing the absolute pressure changed in accordance with a change in an engine speed when the subthrottle valve is fully open.

The present invention may be more fully understood from the description of preferred embodiments of the invention set forth below, together with the accompanying drawings.

DESCRIPTION OF THE PREFERRED EMBODIMENTS

Figure 1A:
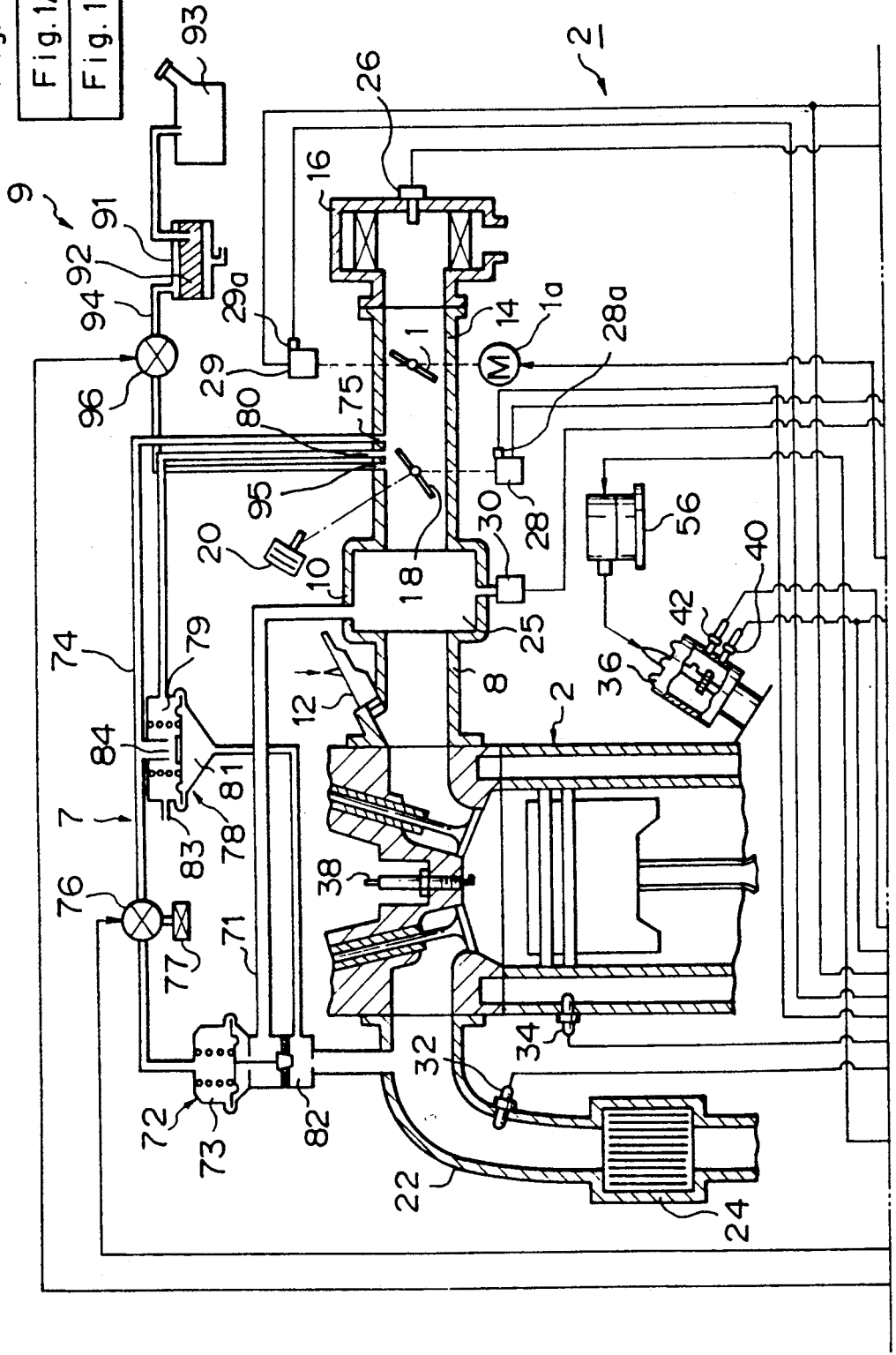
FIG. 1 is a schematically illustrated cross-sectional view of an engine.

FIG. 1 illustrates a case where the present invention is applied to a vehicle using a front engine-rear drive system.

Referring to FIG. 1, 2 designates a four-cylinder engine, 4 a first electronic control unit for controlling the output torque of the engine 2, and 6 a second electronic control unit for executing the controls of the fuel injection and the ignition time. This engine 2 is equipped with an EGR device 7 and a fuel vapor supply device 9. The cylinders of the engine 2 are connected to a surge tank 10 via corresponding branches 8, and fuel injectors 12 are mounted on the corresponding branches 8. The surge tank 10 is connected to an air cleaner 16 via an intake duct 14, and a main throttle valve 18 connected to an accelerator pedal 20 is arranged in the intake duct 14. Further, a subthrottle valve 1 driven by a step motor 1a is arranged in the intake duct 14 upstream of the main throttle valve 18. The cylinders of the engine are connected to a three-way catalytic converter 24 via an exhaust manifold 22.

The first electronic control unit 4 is constructed as a digital computer and comprises a CPU (microprocessor, etc.) 4a, a ROM (read only memory) 4b, a RAM (random access memory) 4c, an input interface 4d and an output interface 4e. The CPU 4a, the ROM 4b, the RAM 4c, the input interface 4d, and the output interface 4e are interconnected via a bidirectional bus 4f.

The second electronic control unit 6 is also constructed as a digital computer and comprises a CPU 6a, a ROM 6b, a RAM 6c, an input interface 6d and an output interface 6e. The CPU 6a, the ROM 6b, the RAM 6c, the input interface 6d and the output interface 6e are interconnected via a bidirectional bus 6f.

An air temperature sensor 26 producing an output voltage proportional to the temperature of air is arranged in the air cleaner 16, and the output voltage of the air temperature sensor 26 is input to the input interface 6d. A main throttle sensor 28 producing an output voltage proportional to the degree of opening of the main throttle valve 18 is attached to the main throttle valve 18, and the output voltage of the main throttle sensor 28 is input to the input interfaces 4d and 6d. This main throttle sensor 28 is equipped with a main throttle valve limit switch 28a producing an output signal when the main throttle valve 18 is closed to an idling position, and the output signal of the main throttle valve limit switch 28a is input to the input interface 6d. A subthrottle sensor 29 producing an output voltage proportional to the degree of opening of the subthrottle valve 1 is attached to the subthrottle valve 1, and the output voltage of the subthrottle sensor 29 is input to the input interfaces 4d and 6d. This subthrottle sensor 29 is equipped with a subthrottle valve limit switch 29a producing an output signal when the subthrottle valve 1 is fully closed, and the output signal of the subthrottle valve limit switch 29a is input to the input interface 6d. A pressure sensor 30 producing an output voltage proportional to the absolute pressure in the surge tank 10 is attached to the surge tank 10, and the output voltage of the pressure sensor 30 is input to the input interfaces 4d and 6d. An oxygen concentration detector 32 producing an output voltage which is abruptly changed at the stoichiometric air-fuel ratio is arranged in the exhaust manifold 22, and the output voltage of the oxygen concentration detector 32 is input to the input interface 6d. A coolant temperature sensor 34 producing an output voltage proportional to the temperature of the engine coolant is mounted on the body of the engine 2, and the output voltage of the coolant temperature sensor 34 is input to the input interface 6d. Further, a distributor 36 is mounted on the body of the engine 2 to distribute an ignition current to spark plugs 38, and a crankangle sensor 40 and a cylinder discriminating sensor 42 are arranged in the distributor 36. The crankangle sensor 40 produces an output pulse at each revolution of 30 degrees of the crankshaft 2a of the engine 2, these output pulses are input to the input interfaces 4d and 6d, and the engine speed is calculated from these output pulses in the electronic control units 4 and 6. The cylinder discriminating sensor 42 produces an output pulse at each two revolutions of the crankshaft 2a, and these output pulses are input to the input interface 6d. Thus, the particular fuel injector 12 and spark plug 38 to be operated can be determined from this output pulse.

As illustrated in FIG. 1, the crankshaft 2a of the engine 2 is connected to an automatic transmission 44 via a torque converter 46, and the output shaft 48 of the automatic transmission 44 is connected to rear wheels 52RR and 52RL via a differential gear 50. Consequently, in the embodiment illustrated in FIG. 1, the rear wheels 52RR and 52RL are the driven wheels, and the front wheels 52FR and 52FL are the free running wheels. A driven wheel speed sensor 54RR is provided for the driven wheel 52RR. This sensor 54RR produces an output pulse at each revolution by a predetermined angle of the driven wheel 52RR, these output pulses of the sensor 54RR are input to the input interface 4d, and the rotating speed of the driven wheel 52RR is calculated in the electronic control unit 4 from these output pulses. Another driven wheel speed sensor 54RL is provided for the driven wheel 52RL. This sensor 54RL produces an output pulse at each revolution by a predetermined angle of the driven wheel 52RL, these output pulses of the sensor 54RL are input to the input interface 4d, and the rotating speed of the driven wheel 52RL is calculated in the electronic control unit 4, from these output pulses. In addition, a free running wheel speed sensor 54FR is provided for the free running wheel 52FR. This sensor 54FR produces an output pulse at each revolution of a predetermined angle of the free running wheel 52FR, these output pulses of the sensor 54FR are input to the input interface 4d, and the rotating speed of the free running wheel 52FR is calculated in the electronic control unit 4, from these output pulses. Another free running wheel speed sensor 54FL is provided for the free running wheel 52FL. This sensor 54FL produces an output pulse each revolution of a predetermined angle of the free running wheel 52FL, these output pulses of the sensor 54FL are input to the input interface 4d, and the rotating speed of free running wheel 52FL is calculated in the electronic control unit 4, from these output pulses.

The output interface 4e of the first electronic control unit 4 is connected, on one hand to the step motor 1a, and on the other hand, to the input interface 6d of the second electronic control unit 6. The output interface 6e of the second electronic control unit 6 is connected, on one hand, to the fuel injectors 12, and on the other hand, to the distributor 36 via an ignitor 56.

Figure 2:
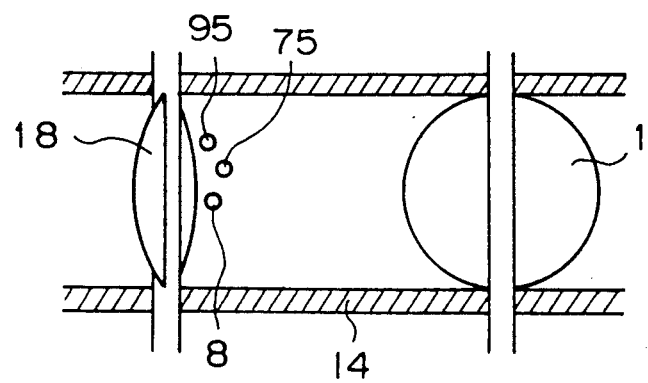
FIG. 2 is a cross-sectional view of the intake duct illustrated in FIG. 1, seen from the bottom of the intake duct.

As illustrated in FIG. 1, the EGR device 7 comprises an EGR passage 71 connecting the exhaust manifold 22 to the surge tank 10, and an EGR control valve 72 arranged in the EGR passage 71 to control the amount of the EGR gas fed into the surge tank 10. The vacuum chamber 73 of the EGR control valve 72 is connected, via a vacuum conduit 74, to a vacuum port 75 formed in the inner wall of the intake duct 14 near the main throttle valve 18. As can be seen from FIGS. 1 and 2, the vacuum port 75 is arranged so that it is open to the intake duct 14 upstream of the main throttle valve 18 when the degree of opening of the main throttle valve 18 is smaller than a fixed degree, i.e., when the engine is operating under a light load, and that the vacuum port 75 is open to the intake duct 14 downstream of the main throttle valve 18 when the degree of the main throttle valve 18 exceeds the fixed degree. An electromagnetic control valve 76, which can be opened to the outside air via an air filter 77, is arranged in the vacuum conduit 74 and connected to the output interface 6e. In addition, a vacuum regulating valve 78 is arranged in the vacuum conduit 74, to maintain a constant EGR ratio (the amount of the EGR gas divided by sum of the amount of the EGR gas and the amount of air fed into the engine cylinders). Namely, this vacuum regulating valve 78 comprises a first chamber 79 connected to a vacuum port 80 formed in the inner wall of the intake duct 14, and a second chamber 81 connected to an inflow chamber 82 of the EGR control valve 72. As illustrated in FIGS. 1 and 2, the vacuum port 80 is arranged so that it is open to the intake duct 14 upstream of the main throttle valve 18 when the degree of opening of the main throttle valve 18 is smaller than a fixed degree, i.e., when the engine is operating under a light load, and that the vacuum port 80 is open to the intake duct 14 downstream of the main throttle valve 18 when the degree of the main throttle valve 18 exceeds the fixed degree.

The electromagnetic control valve 76 is normally energized, and at this time, the vacuum chamber 73 of the EGR valve 72 is connected to the vacuum port 75. Further, the subthrottle valve 1 normally remains fully open, and furthermore, when the engine is operating under a light load, the vacuum port 75 is open to the intake duct 14 upstream of the main throttle valve 18. Consequently, when the engine is operating under a light load, the pressure in the vacuum chamber 73 of the EGR control valve 72 is substantially equal to the atmospheric pressure, and as a result, since the EGR control valve 72 is closed, the recirculation of the EGR gas is stopped.

When the engine is operating under a medium load, i.e., when the main throttle valve 18 is half open, since both of the vacuum ports 75 and 80 are open to the intake duct 14 downstream of the main throttle valve 18, a large vacuum acts on both the vacuum ports 75 and 80, and as a result, since the EGR control valve 72 is open, the EGR gas is recirculated. At this time, since the first chamber 79 of the vacuum regulating valve 78 is connected to the outside air via an air vent 83, a vacuum smaller than, and proportional to, a vacuum in the intake duct 14 is produced in the first chamber 79. At this time, if the absolute pressure in the inflow chamber 82 of the EGR control valve 72, i.e., in the second chamber 81 of the vacuum regulating valve 78, becomes lower than the absolute pressure in the first chamber 79, the valve port 84 is open to the first chamber 79. As a result, since a vacuum in the vacuum chamber 73 becomes small, the EGR control valve 72 is actuated to move in the closing direction thereof, and thus the absolute pressure in the inflow chamber 82 becomes high. If the absolute pressure in the inflow chamber 82 becomes higher than that in the first chamber 79, the valve port 84 is closed. As a result, since a vacuum in the vacuum chamber 73 becomes large, the EGR control valve 72 is actuated to move in the opening direction thereof, and thus the absolute pressure in the inflow chamber 82 becomes low. Consequently, since the absolute pressure in the inflow chamber 82 is controlled so that it becomes approximately equal to the absolute pressure in the first chamber 79, i.e., since the absolute pressure in the inflow chamber 82 is proportional to that in the purge tank 10, the EGR ratio is maintained at an approximately constant value.

When the engine is operating under a heavy load, i.e., the main throttle valve 18 is fully open, the pressure in the vacuum chamber 73 becomes approximately equal to the atmospheric pressure, and accordingly, at this time the recirculation of the EGR gas is stopped. The fuel vapor supply device 9 comprises a charcoal canister 91 having activated carbon 92 therein and connected to the fuel tank 93; fuel vapor generated in the fuel tank 93 is adsorbed by the activated carbon 92. Further, the charcoal canister 91 is connected, via a fuel vapor conduit 94, to a purge port 95 formed in the inner wall of the intake duct 14 near the main throttle valve 18. As can be seen from FIGS. 1 and 2, the purge port 95 is arranged so that it is open to the intake duct 14 upstream of the main throttle valve 18 when the degree of opening of the main throttle valve 18 is smaller than a fixed degree, i.e., when the engine is operating under a light load, and that the purge port 95 is open to the intake duct 14 downstream of the main throttle valve 18 when the degree of the main throttle valve 18 exceeds the fixed degree. An electromagnetic control valve 96 is arranged in the fuel vapor conduit 94 and connected to the output interface 6e.

The electromagnetic control valve 96 is normally energized, and at this time the charcoal canister 91 is connected to the purge port 95. When the engine is operating under a light load, the purge port 95 is open to the intake duct 14 upstream of the main throttle valve 1, and thus at this time the purging operation of the fuel vapor is not carried out. Conversely, when the engine is operating under a medium load, a large vacuum acts on the purge port 95. Consequently, at this time the fuel vapor adsorbed by the activated carbons 92 is purged into the intake duct 14 from the purge port 95. When the engine is operating under a heavy load, the pressure acting on the purge port 95 becomes approximately equal to the atmospheric pressure, and thus the purging operation of the fuel vapor is not carried out at this time.

Next, the acceleration slippage control will be described with reference to the time chart illustrated in FIG. 3 and the flow chart illustrated in FIG. 4.

Figure 4B:
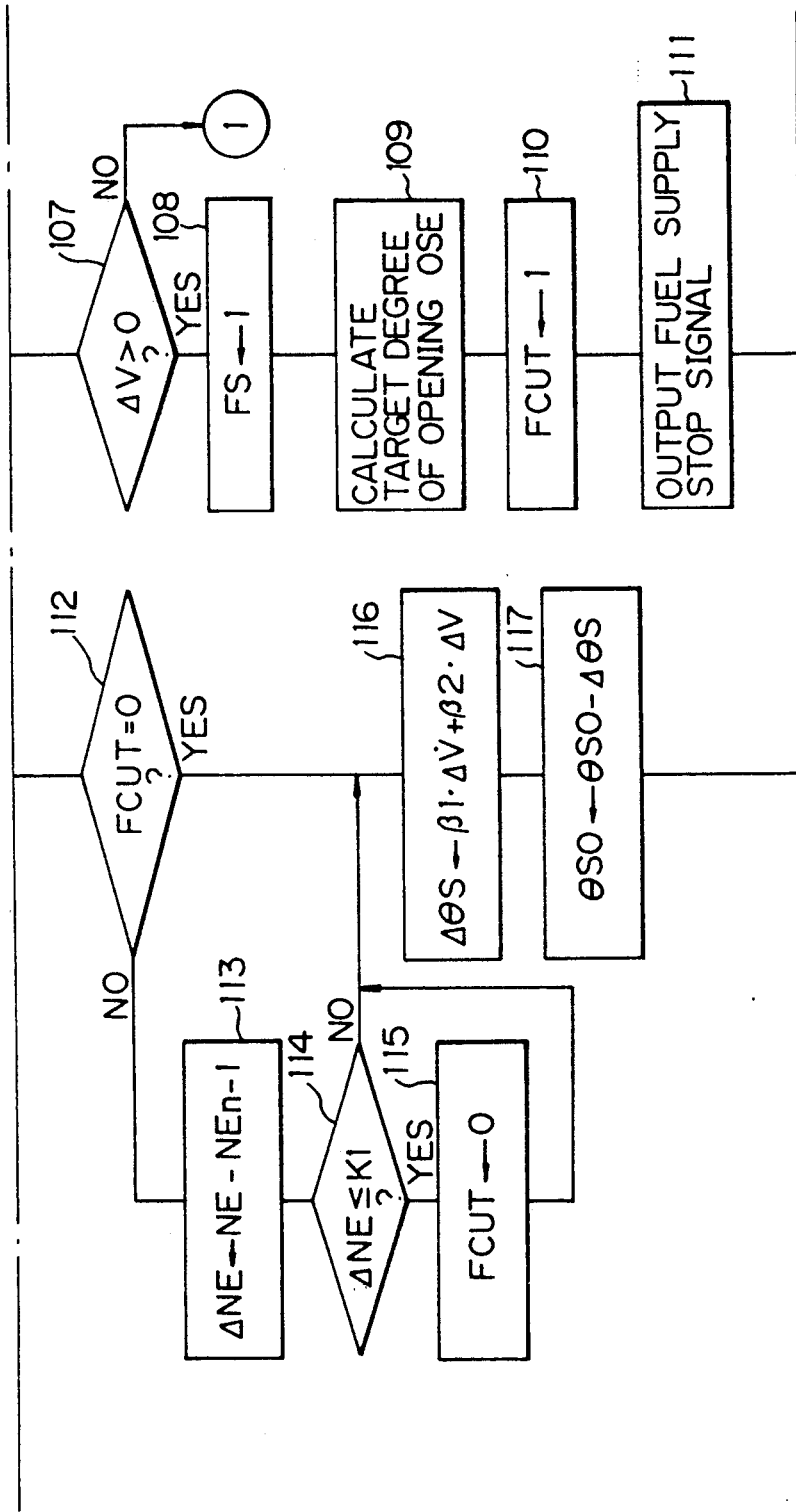
FIG. 4 is a flow chart for executing the acceleration slippage control.

FIG. 4 illustrates a routine for executing the acceleration slippage control, and this routine is processed by sequential interruptions executed at predetermined intervals in the first electronic control unit 4.

Referring to FIG. 4, in step 100, it is determined whether or not the condition for executing the acceleration slippage control is satisfied. When the main throttle valve 18 is in the idling position, or when the transmission 44 is in the neutral range, the slippage of the driven wheel 52RR or 52RL will not occur. Consequently, at this time it is determined that the condition for executing the acceleration slippage control is not satisfied. Further, when the acceleration slippage control is prohibited due to other control conditions, it is also determined that the condition for executing the acceleration slippage control is not satisfied. When the condition for executing the acceleration slippage control is not satisfied, the routine jumps to step 101. In step 101, the count value CEND is made zero and the flags FS and FCUT are reset. Also, the target degree of opening $\theta$SO of the subthrottle valve 1 is made the maximum target degree of opening $\theta S_{max}$, for example, 90°.

Figure 5:
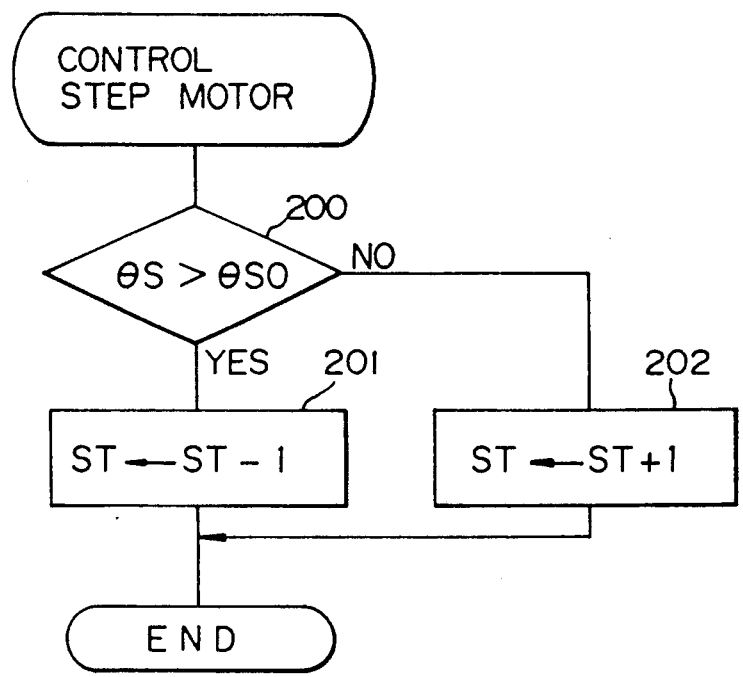
FIG. 5 is a flow chart for controlling the step motor.

FIG. 5 illustrates a routine for controlling the step motor 1a, and this routine is processed by sequential interruptions which are executed at predetermined intervals.

Referring to FIG. 5, in step 200, it is determined whether or not the actual degree of opening $\theta$S of the subthrottle valve 1, which is detected by the subthrottle sensor 29, is larger than the target degree of opening $\theta$SO. If $\theta S > \theta SO$, the routine goes to step 201. In step 201, the step position of the step motor 1a is decremented by one, and thus the subthrottle valve 1 is rotated in the closing direction. Conversely, if $\theta S < \theta SO$, the routine goes to step 202, and in step 202, the step position of the step motor 1a is incremented by one, and thus the subthrottle valve 1 is rotated in the opening direction. Namely, the step motor 1a is driven so that the actual degree of opening $\theta$S of the subthrottle valve 1 becomes equal to the target degree of opening $\theta$SO.

As mentioned above, in step 101 of FIG. 4, the target degree of opening $\theta$SO is made the maximum degree of opening $\theta S_{max}$, and thus the subthrottle valve 1 remains fully open at this time. Then, in step 102, the output of the fuel supply stop signal to the output interface 4e is stopped.

Figure 6:
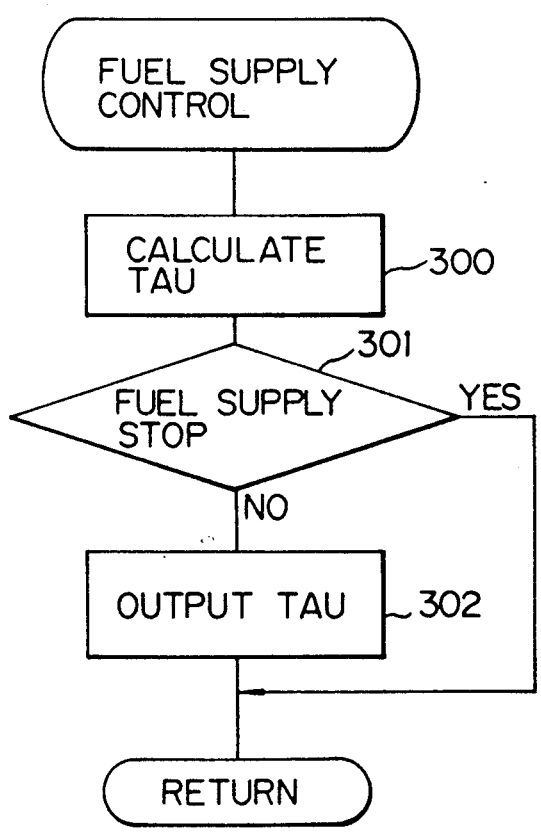
FIG. 6 is a flow chart of the main routine.

FIG. 6 illustrates a main routine which is executed in the first electronic control unit 6 for controlling the supply of fuel.

Referring to FIG. 6, the fuel injection time TAU is calculated in step 300, and then in step 301, it is determined whether or not the fuel supply stop signal has been output to the output interface 4e. If the fuel supply stop signal has not been output to the output interface 4e, the routine goes to step 302 and the fuel injection time TAU is output to the output interface 6e. Accordingly, the injection of fuel is then carried out. If the fuel supply stop signal has been output to the output interface 4e, the fuel injection time TAU is not output to the output interface 6e, and thus the injection of fuel is then stopped.

As mentioned above, in step 102 of FIG. 4, the output of the fuel supply stop signal is stopped and thus the injection of fuel is then carried out.

When it is determined in step 100 that the condition for executing the acceleration slippage control is satisfied, the routine goes to step 103. In step 103, the apparent vehicle speed VR and the actual vehicle speed VF are calculated from the output signals of the speed sensors 54RR, 54RL, 54FL and 54FR. In this embodiment, the mean value of the rotating speeds VRR and VRL of the driven wheels 52RR and 52RL is saved as the apparent vehicle speed VR, and the mean value of the rotating speeds VFR and VFL of the free running wheels 52FR and 52FL is saved as the actual vehicle speed VF. Then, in step 104, a target speed VS of the driven wheels 52RR and 52RL is calculated by multiplying the actual vehicle speed VF by a predetermined target slippage rate $\alpha$ (for example 1.2), and in step 105, the speed difference $\Delta V$ between the apparent vehicle speed VR and the target speed VS is calculated. This speed difference $\Delta V$ represents the actual slippage amount. In this embodiment, when $\Delta V$ is positive, the acceleration slippage control is carried out.

Figure 7:
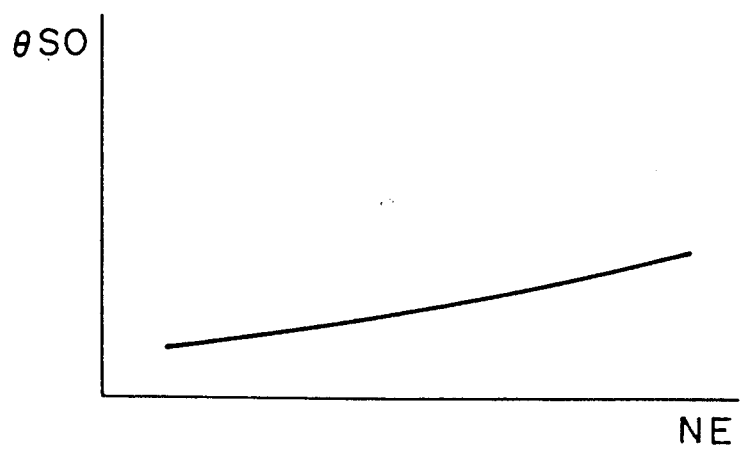
FIG. 7 is a diagram illustrating the target degree of opening of the subthrottle valve.

Then, in step 106, it is determined whether or not a flag FS indicating that the acceleration slippage control is being carried out is set. When the flag FS is reset, i.e., when the acceleration slippage control is not being carried out, the routine goes to step 107 and it is determined whether or not the speed difference $\Delta V$ is positive. If $\Delta V \leq 0$, it is determined that the slippage of the driven wheels 52RR or 52RL has not occurred, and the routine jumps to step 101. Conversely, if $\Delta V > 0$, it is determined that the slippage of the driven wheel 52RR or 52RL has occurred. At this time, the routine goes to step 108 and the flag FS is set, and the acceleration slippage control is started. Then, in step 109, the target degree of opening $\theta$SE of the subthrottle valve 1 is calculated from the engine speed N, on the basis of the relationship illustrated in FIG. 7, and this relationship is stored in the ROM 4b. Then, in step 110 a flag FCUT indicating that the supply of fuel is to be stopped is set, and in step 111, the fuel supply stop signal is output to the output interface 4e. At this time, as mentioned above, in the routine illustrated in FIG. 6, the supply of fuel to all of the cylinders is stopped.

Figure 3:
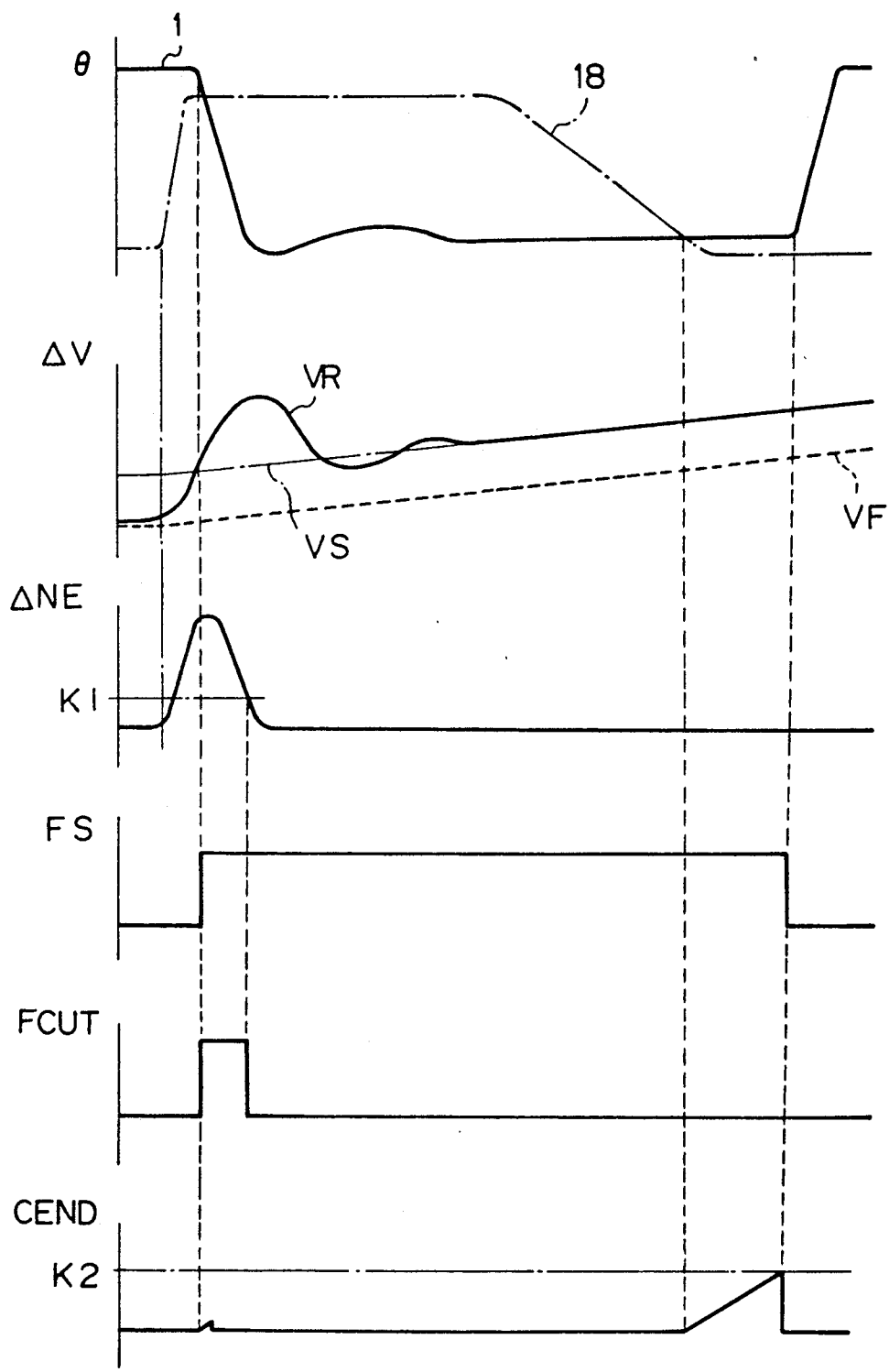
FIG. 3 is a time chart illustrating the acceleration slippage control.

Namely, as illustrated in FIG. 3, when the main throttle valve 18 is abruptly opened, if the slippage of the driven wheel 52RR or 52RL occurs, the engine speed is abruptly increased, and thus the apparent vehicle speed VR is also abruptly increased. At this time, if the apparent vehicle speed VR exceeds the target speed VS, the flags FS and FCUT are set and the subthrottle valve 1 is moved from the fully open position toward the target degree of opening $\theta$SE.

Turning to FIG. 4, once the flag FS is set the routine goes from 111 to step 112, and it is determined whether or not the flag FCUT is reset. If the flag FCUT is set, the routine goes to step 113 and the speed difference $\Delta$NE of the engine is calculated by subtracting the engine speed $NE_{n-1}$ in the preceding processing cycle from the present engine speed NE. This speed difference $\Delta$NE represents the degree of acceleration of the engine. Then, in step 114 it is determined whether or not the speed difference $\Delta$NE has become lower than a predetermined value K1. If $\Delta$NE > K1, the routine goes to step 116. Conversely, when the speed difference $\Delta$NE becomes lower than K1, the routine goes to step 115 and the flag FCUT is reset, and then the routine goes to step 116.

Namely, in this embodiment, if the slippage of the driven wheels 52RR or 52RL occurs, the supply of fuel to all of the cylinders is stopped, to cover the delay of the response by the closing operation of the subthrottle valve 1. Thereafter, as illustrated in FIG. 3, when $\Delta$NE becomes lower than K1, i.e., immediately before the speed difference $\Delta V$ reaches the maximum value, the flag FCUT is reset, and thus the supply of fuel to all of the cylinders is started again.

In step 116, the correction value $\Delta\theta$S of the degree of opening of the subthrottle valve 1 is calculated by the following equation.

$$\Delta\theta S = \beta 1 \cdot \Delta \dot{V} + \beta 2 \cdot \Delta V$$

Where, $\Delta \dot{V}$ indicates the differential value of the speed difference $\Delta V$, and $\beta 1$ and $\beta 2$ indicate proportional constants. Then, in step 117, the target degree of opening $\theta$SO is calculated by subtracting $\Delta\theta$S from $\theta$SO. Consequently, it will be understood that, if $\Delta V$ is positive, the target degree of opening $\theta$SO becomes small, and if $\Delta V$ is negative, the target degree of opening $\theta$SO becomes large. Then, in step 118, it is determined whether or not the target degree of opening $\theta$SO of the subthrottle valve 1 is larger than the degree of opening $\theta$M of the main throttle valve 18. If $\theta$SO < $\theta$H, the routine goes to step 119 and the count value CEND is made zero, and the processing cycle is then completed. Consequently, the subthrottle valve 1 is controlled by the step motor 1a so that the degree of opening thereof becomes equal to the target degree of opening $\theta$SO, as long as $\theta$SO ≦ $\theta$H. When the target degree of opening $\theta$SO of the subthrottle valve 1 is larger than the degree of opening $\theta$H of the main throttle valve 18, the routine goes to step 120 and the count value CEND is incremented by one. Then, in step 121, it is determined whether or not the count value CEND exceeds a predetermined value K2. When the count value CEND exceeds K2, the routine goes to step 101. If a predetermined time has elapsed after the target degree of opening $\theta$SO of the subthrottle valve 18 becomes larger than the degree of opening $\theta$H of the main throttle valve 18, it is considered that the slippage of the driven wheels 52RR or 52RL will no longer occur, and accordingly, the target degree of opening $\theta$SO of the subthrottle valve 1 is then made the maximum degree of opening $\theta S_{max}$, and thus, as illustrated in FIG. 3, the subthrottle valve 1 is moved to the fully open position.

Figure 8:
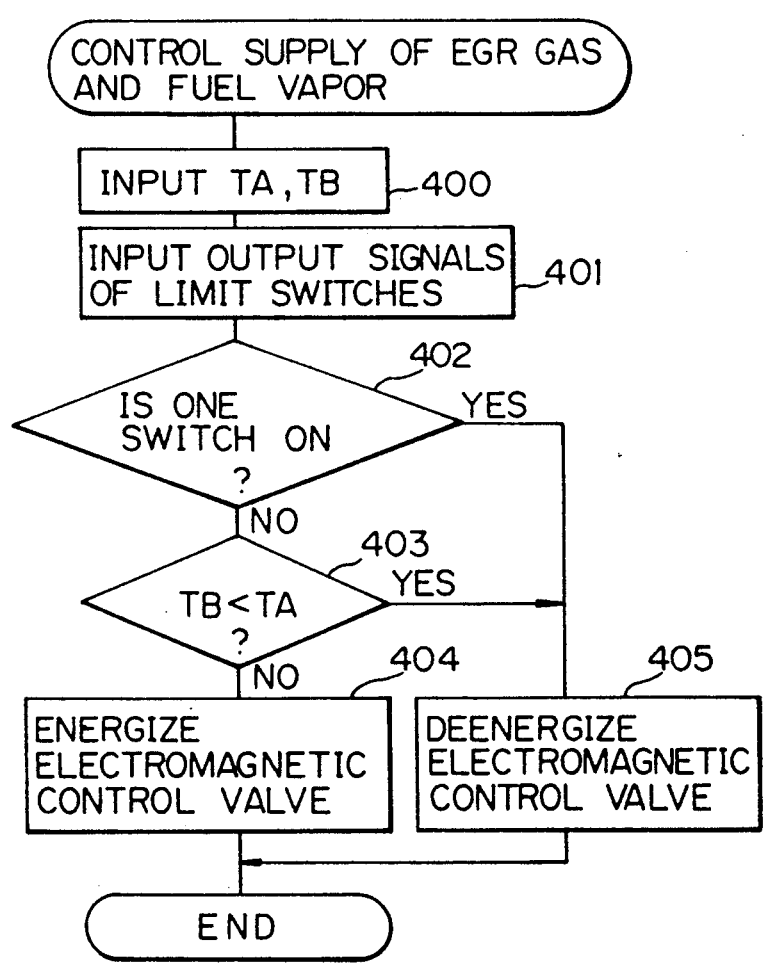
FIG. 8 is a flow chart for controlling the supply of EGR gas and fuel vapor.

FIG. 8 illustrates a routine for executing a control of the supply of EGR gas and fuel vapor, and this routine is processed by sequential interruptions which are executed at predetermined intervals in the second electronic control unit 6.

Referring to FIG. 8, in step 400, the output signal of the main throttle sensor 28, which represents the degree of opening TA thereof, and the output signal of the subthrottle sensor 29, which represents the degree of opening TB thereof are input to the CPU 6a. Then, in step 401, the output signals of the main throttle valve limit switch 28a and the subthrottle valve limit switch 29a are input to the CPU 6a. Thereafter, in step 402, it is determined whether or not one of the limit switches 28a or 29a has been made ON, i.e., whether or not the main throttle valve 18 is in the idling position or the subthrottle valve 1 is fully closed. When one of the limit switches 28a or 29a has been made ON, the routine goes to step 405 and the electromagnetic control valves 76 and 96 are deenergized. At this time, since the vacuum chamber 73 of the EGR control valve 72 is open to the outside air, the recirculation of the EGR gas is stopped, and further, since the fuel vapor passage 94 is closed, the supply of fuel vapor is stopped.

When both of the limit switches 28a and 29a are ON, the routine goes to step 403 and it is determined whether or not the degree of opening TB of the subthrottle valve 1 is smaller than the degree of opening TA of the main throttle valve 18. If TB<TA, the routine goes to step 405, and the recirculation of the EGR gas and the supply of fuel vapor are stopped. Conversely, if TB≧TA, the routine goes to step 404 and both of the electromagnetic control valves 76 and 96 are energized. At this time, the EGR device 7 and the fuel vapor supply device 9 are in a state in which the supply of the EGR gas and the supply of the fuel vapor can be carried out, respectively.

The lowering of the output torque of the engine begins when the degree of opening TB of the subthrottle valve 1 becomes smaller than the degree of opening TA of the main throttle valve 18, i.e., the actual acceleration slippage control begins when the degree of opening TB of the subthrottle valve 1 becomes smaller than the degree of opening TA of the main throttle valve 18. Consequently, in the embodiment illustrated in FIG. 8, when the degree of opening TB of the subthrottle valve 1 becomes smaller than the degree of opening TA of the main throttle valve 28, i.e., when the actual acceleration slippage control is started, the supply of both the EGR gas and the fuel vapor is stopped. As mentioned above, in this embodiment, since the supply of the EGR gas is stopped when the actual acceleration slippage control is started, there is no danger that the output torque of the engine will become excessively low, and as a result, it is possible to prevent surging of the engine and misfiring, and to prevent engine stalling. Further, in this embodiment, since the supply of the fuel vapor is stopped when the actual acceleration slippage control is started, there is no danger that the air-fuel mixture will become excessively rich, and therefore, it is possible to prevent the engine stalling. In addition, since the supply of the EGR gas and the fuel vapor is stopped when the engine is in an operating state wherein the supply of the EGR gas and the fuel vapor is to be stopped, there is no danger that the learning coefficient for the air-fuel ratio will be incorrectly renewed, and as a result, it is possible to correctly control the air-fuel even immediately after the acceleration slippage control is completed.

Further, in this embodiment, even if the closing operation of the subthrottle valve 1 is started, the supply of the EGR gas is carried out until the degree of opening TB of the subthrottle valve 1 reaches the degree of opening TA of the main throttle valve 18. Consequently, during this time, it is possible to reduce the amount of $NO_x$ in the exhaust gas.

Furthermore, in the embodiment illustrated in FIG. 8, when the slippage of the driven wheels 52RR or 52RL does not occur, since the subthrottle valve 1 remains fully open, the routine goes from step 403 to step 404. Consequently, at this time, the EGR device 7 and the fuel vapor supply device 9 are maintained in a state in which the supply of the EGR gas and the fuel vapor can be carried out.

In the embodiment illustrated in FIG. 1, the engine is equipped with both the EGR device 7 and the fuel vapor supply device 9, but the present invention may be applied to an engine equipped with only the EGR device or only the fuel vapor supply device. Further, the present invention may be applied to an engine having a device for feeding a gas other than the EGR gas and the fuel vapor into the intake passage.

Figure 9:
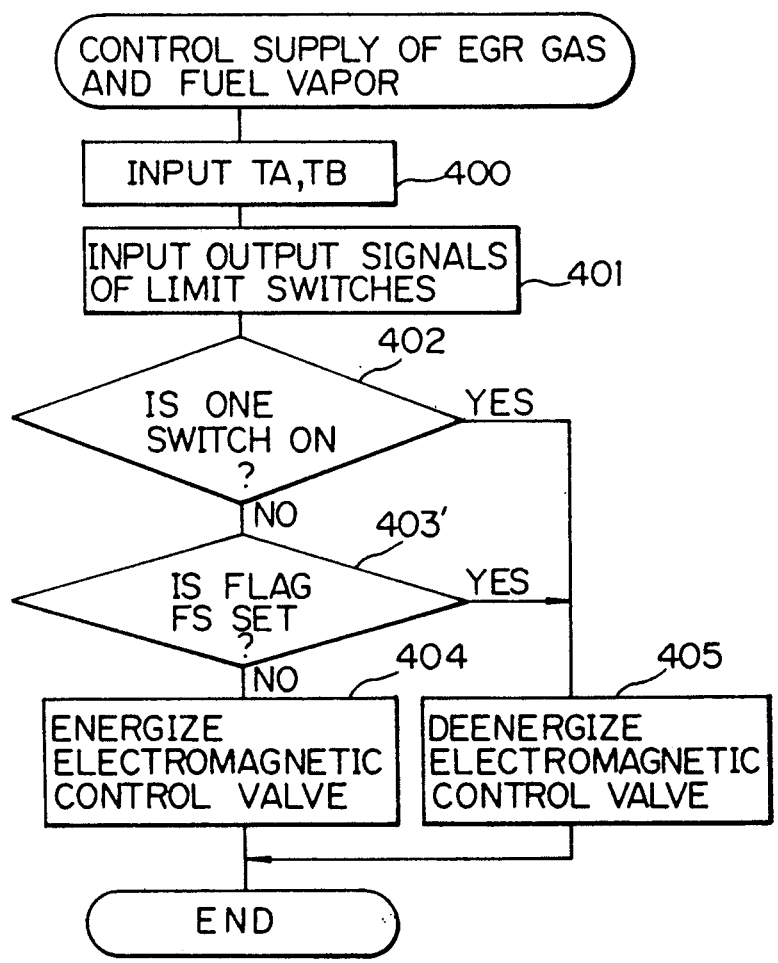
FIG. 9 is a flow chart illustrating a modification of the routine illustrated in FIG. 8.

FIG. 9 illustrates a modification of the routine illustrated in FIG. 8.

In this embodiment, only step 403' is different from step 403 of FIG. 8; the remaining steps are the same as the corresponding steps of FIG. 8. In this embodiment, in step 403', it is determined whether or not the flag FS is set. If the flag FS is set, the routine goes to step 405 and the supply of the EGR gas and the fuel vapor is stopped.

Figure 10:
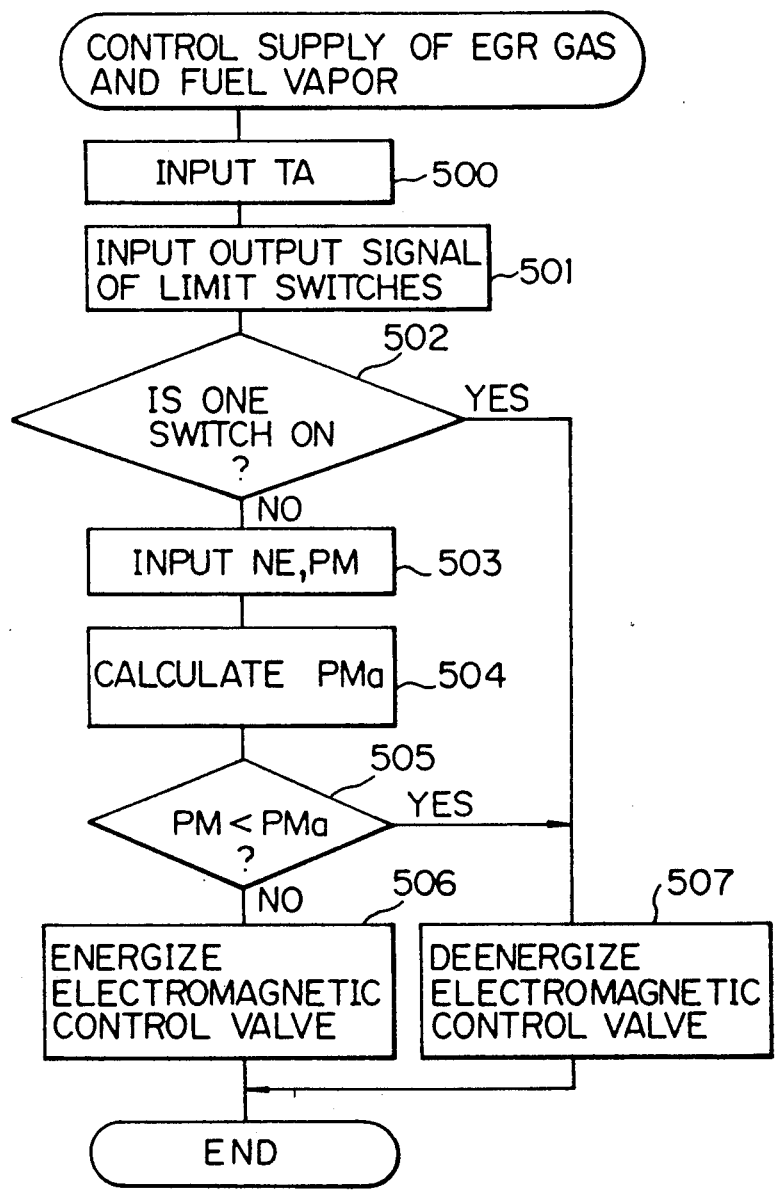
FIG. 10 is a flow chart illustrating another embodiment of FIG. 8.

FIG. 10 illustrates another embodiment of the routine illustrated in FIG. 8.

Figure 11:
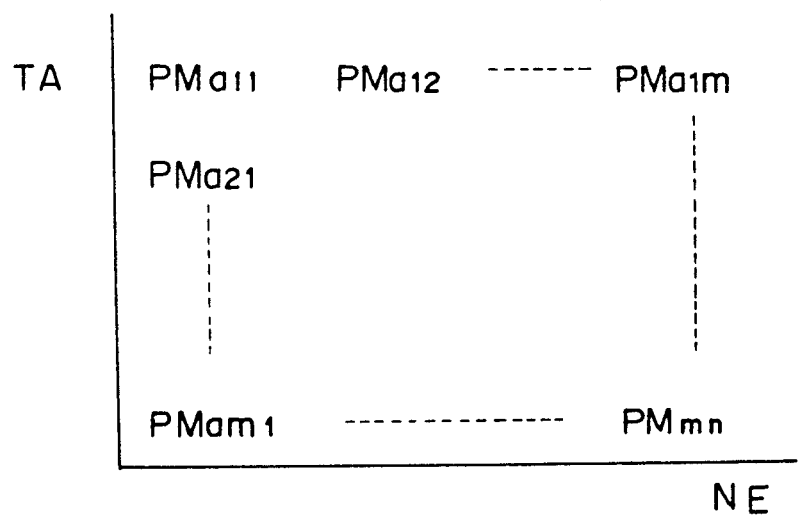
FIG. 11 is a view illustrating a map.

Referring to FIG. 10, in this embodiment, in steps 500, the output signal of the main throttle sensor 28, which represents the degree of opening TA thereof, is input to the CPU 6a. Then, in step 501, the output signals of the main throttle valve limit switch 28a and the subthrottle valve limit switch 29a are input to the CPU 6a. Then, in step 502, it is determined whether or not one of the limit switches 28a or 29a has been made ON, i.e., whether or not the main throttle valve 18 is in the idling position or the subthrottle valve 1 is fully closed. When one of the limit switches 28a or 29a has been made ON, the routine goes to step 7 and the electromagnetic control valves 76 and 96 are deenergized. At this time, since the vacuum chamber 73 of the EGR control valve 72 is open to the outside air, the recirculation of the EGR gas is stopped. Further, since the fuel vapor passage 94 is shut off, the supply of fuel vapor is stopped. When both of the limit switches 28a and 29a are ON, the routine goes to step 503 and the engine speed NE and the absolute pressure PM in the surge tank 10 are input to the CPU 6a. Then, in step 504, the absolute pressure PMa, which is obtained when the subthrottle valve 1 remains fully open, is calculated from the map illustrated in FIG. 11 on the basis of the engine speed NE and the degree of opening TA of the main throttle valve 18. This map is stored in the ROM 6b. Then, in step 505, it is determined whether or not the actual absolute pressure PM is lower than the absolute pressure PMa. If PM<PMa, the routine goes to step 507 and the recirculation of the EGR gas and the supply of fuel vapor are stopped. Conversely, if PM>PMa, the routine goes to step 506 and the electromagnetic control values 76 and 96 are energized. At this time, the EGR device 7 and the fuel vapor supply device 9 are in a state in which the supply of the EGR gas and the supply of the fuel vapor can be carried out, respectively.

When PM becomes lower than PMa, it is considered that the actual acceleration slippage control has been started, and accordingly, in this embodiment, when PM becomes lower than PMa, the supply of the EGR gas and the fuel vapor is stopped. In this case, in an engine equipped with an air flow meter for detecting the amount of air Q fed into the engine, instead of comparing PM and PMa, it is possible to compare the actual engine load Q/N (the amount of air Q/the engine speed N) and the engine load (Q/N)a which is obtained when the subthrottle valve 1 remains fully open.

According to the present invention, when the acceleration slippage control is started, since the supply of an additional gas such as an EGR gas and a fuel vapor into the intake passage is stopped, there is no danger that the air-fuel mixture will become excessively rich or lean.

Although the invention has been described with reference to specific embodiments chosen for purposes of illustration, it should be apparent that numerous modifications could be made thereto by those skilled in the art without departing from the basic concept and scope of the invention.

We claim:

1. A traction control device of a vehicle having a free running wheel and a driven wheel driven by an engine having a main throttle valve arranged in an intake passage and controlled by an accelerator pedal; said traction control device comprising;
   a normally opened subthrottle valve arranged in the intake passage upstream of the main throttle valve;
   means for detecting the rotating speed of the free running wheel;
   means for detecting the rotating speed of the driven wheel;
   speed difference calculating means for calculating a speed difference between the rotating speed of the free running wheel and the rotating speed of the driven wheel;
   valve control means for controlling said subthrottle valve in response to said speed difference to close said subthrottle valve when said speed difference exceeds a predetermined value;
   additional gas supply means for feeding an additional gas into the intake passage, the amount of said additional gas being changed in accordance with a level of vacuum in the intake passage downstream of said subthrottle valve;
   a main throttle sensor for detecting the degree of opening of the main throttle valve;
   a pressure sensor for detecting an absolute pressure in the intake passage downstream of the main throttle valve;
   a memory storing said absolute pressure changed in accordance with a change in an engine speed when said subthrottle valve is fully open; and supply control means for controlling said additional gas supply means to stop the supply of said additional gas when said subthrottle valve is closed, said supply control means stopping the supply of said additional gas when the absolute pressure detected by said pressure sensor is lower than the absolute pressure stored in said memory.

2. A traction control device according to claim 1, wherein said additional gas supply means comprises an exhaust gas recirculation device, and said additional gas is an exhaust gas.

3. A traction control device according to claim 2, wherein said exhaust gas recirculation device comprises a exhaust gas recirculation passage connected to the intake passage, and a recirculation control valve arranged in said exhaust gas recirculation passage and controlled by a vacuum acting on a vacuum port formed in an inner wall of the intake passage around the main throttle valve, and said supply control means stops the supply of said exhaust gas by stopping the control of said recirculation control valve, which is caused by said vacuum.

4. A traction control device according to claim 3, wherein said vacuum port is open to the intake passage upstream of the main throttle valve when the degree of opening of the main throttle valve is smaller than a predetermined degree, and said vacuum port is open to the intake passage downstream of the main throttle valve when the degree of opening of the main throttle valve is larger than said predetermined degree.

5. A traction control device according to claim 3, wherein said recirculation control valve further includes a vacuum chamber connected to said vacuum port, and wherein said supply control means comprises a valve arranged between said vacuum chamber and said vacuum port to selectively connect said vacuum chamber to one of said vacuum port and the outside air.

6. A traction control device according to claim 5, further comprising a vacuum regulating valve for controlling the level of vacuum in said vacuum chamber in response to a vacuum acting on another vacuum port formed in the inner wall of the intake passage around the main throttle valve, to maintain an exhaust gas recirculation rate at a constant value.

7. A traction control device according to claim 6, wherein said other vacuum port is open to the intake passage upstream of the main throttle valve when the degree of opening of the main throttle valve is smaller than a predetermined degree, and said other vacuum port is open to the intake passage downstream of the main throttle valve when the degree of opening of the main throttle valve is larger than said predetermined degree.

8. A traction control device according to claim 1, wherein said additional gas supply means comprises a fuel vapor supply device, and said additional gas is fuel vapor.

9. A traction control device according to claim 8, wherein said fuel vapor supply device comprises a charcoal canister having activated carbon therein for adsorbing fuel vapor and connected to a purge port formed in an inner wall of the intake passage around the main throttle valve, and said supply control means comprises a valve arranged between said charcoal canister and said purge port to stop the supply of the fuel vapor.

10. A traction control device according to claim 9, wherein said purge port is open to the intake passage upstream of the main throttle valve when the degree of opening of the main throttle valve is smaller than a predetermined degree, and said purge port is open to the intake passage downstream of the main throttle valve when the degree of opening of the main throttle valve is larger than said predetermined degree.

11. A traction control device according to claim 1, further comprising a subthrottle sensor for detecting the degree of opening of said subthrottle valve, said supply control means stopping the supply of said additional gas when the degree of opening of said subthrottle valve is smaller than the degree of opening of the main throttle valve.

12. A traction control device according to claim 1, wherein said supply control means begins the stopping operation of the supply of said additional gas when said speed difference exceeds said predetermined value.

13. A traction control device according to claim 12, further comprising a subthrottle sensor for detecting the degree of opening of said subthrottle valve, said supply control means permitting the supply of said additional gas when a predetermined time has elapsed after the degree of opening of said subthrottle valve becomes larger than the degree of opening of the main throttle valve.

14. A traction control device according to claim 1, wherein said predetermined value of said speed difference is proportional to the rotating speed of the driven wheel.

15. A traction control device according to claim 1, wherein said valve control means closes said subthrottle valve to a predetermined target degree of opening when said speed difference exceeds said predetermined value.

16. A traction control device according to claim 15, wherein said predetermined target degree of opening is stored in a memory and becomes larger as an engine speed is increased.

17. A traction control device according to claim 15, wherein a target degree of opening $\theta SO$ of said subthrottle valve is initially made said predetermined target degree of opening and then renewed by a following equation on the basis of said speed difference $\Delta V$.

$$\theta SO = \theta SO = -(\beta 1 \cdot \Delta V + \beta 2 \cdot \Delta V)$$

Where $\Delta V$: differential of $\Delta V$ $\beta 1$, $\Delta 2$: constant

18. A traction control device according to claim 1, further comprising a subthrottle sensor for detecting the degree of opening of said subthrottle valve, said valve control means opening said subthrottle valve to a fully open position when a predetermined time has elapsed after the degree of opening of said subthrottle valve becomes larger than the degree of opening of the main throttle valve.

19. A traction control device according to claim 1, further comprising a fuel supply means for controlling the supply of fuel into a cylinder of the engine to temporarily stop the supply of fuel when said speed difference exceeds said predetermined value.

20. A traction control device according to claim 19, further comprising a calculating means for calculating a rate of change of an engine speed, and wherein said fuel supply means starts the supply of fuel again when said rate of change becomes lower than a predetermined value.

* * * * *